(12) United States Patent
Mori

(10) Patent No.: US 7,050,621 B2
(45) Date of Patent: May 23, 2006

(54) SPECIFIED PATTERN DETECTING APPARATUS

(75) Inventor: Toshihiro Mori, Neyagawa (JP)

(73) Assignee: Minolta Co., Ltd., Osaka (JP)

( * ) Notice: Subject to any disclaimer, the term of this patent is extended or adjusted under 35 U.S.C. 154(b) by 491 days.

(21) Appl. No.: 09/757,529

(22) Filed: Jan. 11, 2001

(65) Prior Publication Data

US 2001/0033687 A1 Oct. 25, 2001

(30) Foreign Application Priority Data

Jan. 13, 2000 (JP) ............................. 2000-004531
Jan. 13, 2000 (JP) ............................. 2000-004532

(51) Int. Cl.
*G06K 9/00* (2006.01)

(52) U.S. Cl. ...................... 382/135; 382/137; 382/138

(58) Field of Classification Search ................ 382/100, 382/135, 137, 138, 139, 140, 149, 179, 209, 382/218, 217, 296, 297, 298, 299, 176; 358/1.2, 358/2.1, 2.99, 3.01, 3.28; 250/559.05; 399/366; 713/176, 179

See application file for complete search history.

(56) References Cited

U.S. PATENT DOCUMENTS 5,153,444 A * 10/1992 Maeda et al. ........... 250/559.05
5,309,524 A * 5/1994 Hirabayashi et al. ....... 382/298
5,390,003 A    2/1995 Yamaguchi et al. ........ 399/366
5,671,277 A * 9/1997 Ikenoue et al. ............ 713/179
6,292,583 B1* 9/2001 Maruo ....................... 382/149
6,301,386 B1* 10/2001 Zhu et al. .................. 382/176
6,538,248 B1* 3/2003 Kametani et al. .......... 250/310

FOREIGN PATENT DOCUMENTS

JP    11-053539    2/1999

* cited by examiner

*Primary Examiner*—Vikkram Bali
(74) *Attorney, Agent, or Firm*—Buchanan Ingersol PC

(57) ABSTRACT

In a specified pattern detection apparatus, a first filter detects a partial image included in a specified pattern in input image data, and a memory device stores bi-level data on the existence of the partial image based on output signals of said first filter. Then, a detector detects the specified pattern from the bi-level data stored in said memory device. In a different way, in a specified pattern detection apparatus, a first resolution converter converts input image data to image data of first resolution. A processor performs a predetermined processing on the image data of first resolution, and a second resolution converter converts the processed image data of first resolution to image data of second resolution lower than the first resolution. Then, a detector detects a specified pattern based on the image data of second resolution.

11 Claims, 7 Drawing Sheets

SPECIFIED PATTERN DETECTING APPARATUS

This application is based on application Nos. 2000-4531 and 2000-4532 filed in Japan, the contents of which are hereby incorporated by reference.

BACKGROUND OF THE INVENTION

1. Field of the Invention

The present invention relates to image recognition, in particular to image recognition of a pattern.

2. Description of Prior Art

As a color copying machine provides more functions with improved performance, forgery becomes a big problem, and effective countermeasures for preventing forgery have been researched and developed. In one of the countermeasures, a specified pattern has been embedded in a pattern in a paper money or the like. When an image is read in copying operation in a copying machine, the scanned image is analyzed. When a specified pattern is detected in image recognition, it is decided that a paper money or the like is going to be copied, and normal image forming is forbidden.

Many data received from an input apparatus are color images having a large amount of information. Further, input or output apparatuses are operated at higher speed and at higher resolution. On the other hand, the image recognition of specified patterns is required to be processed in real time, whereas a hardware structure therefor has a more complicated structure. Therefore, in order to prevent forgery, it is an important problem to develop image recognition of specified patterns which can be performed at high speed, at high precision and with a simple structure.

SUMMARY OF THE INVENTION

An object of the present invention is to recognize an image of a specified pattern at higher speed, at higher precision with a simpler structure.

In one aspect of the invention, a specified pattern detection apparatus has a first filter which detects a partial image included in a specified pattern in input image data. A memory device stores bi-level data on the existence of the partial image based on output signals of said first filter. Then, a detector detects the specified pattern from the bi-level data stored in said memory device.

In another aspect of the invention, a specified pattern detection apparatus has a first resolution converter which converts input image data to image data of first resolution. A processor performs a predetermined processing on the image data of first resolution, and a second resolution converter converts the processed image data of first resolution to image data of second resolution lower than the first resolution. Then, a detector detects a specified pattern based on the image data of second resolution.

An advantage of the present invention is that a specified pattern can be detected at a higher speed with a simple structure.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
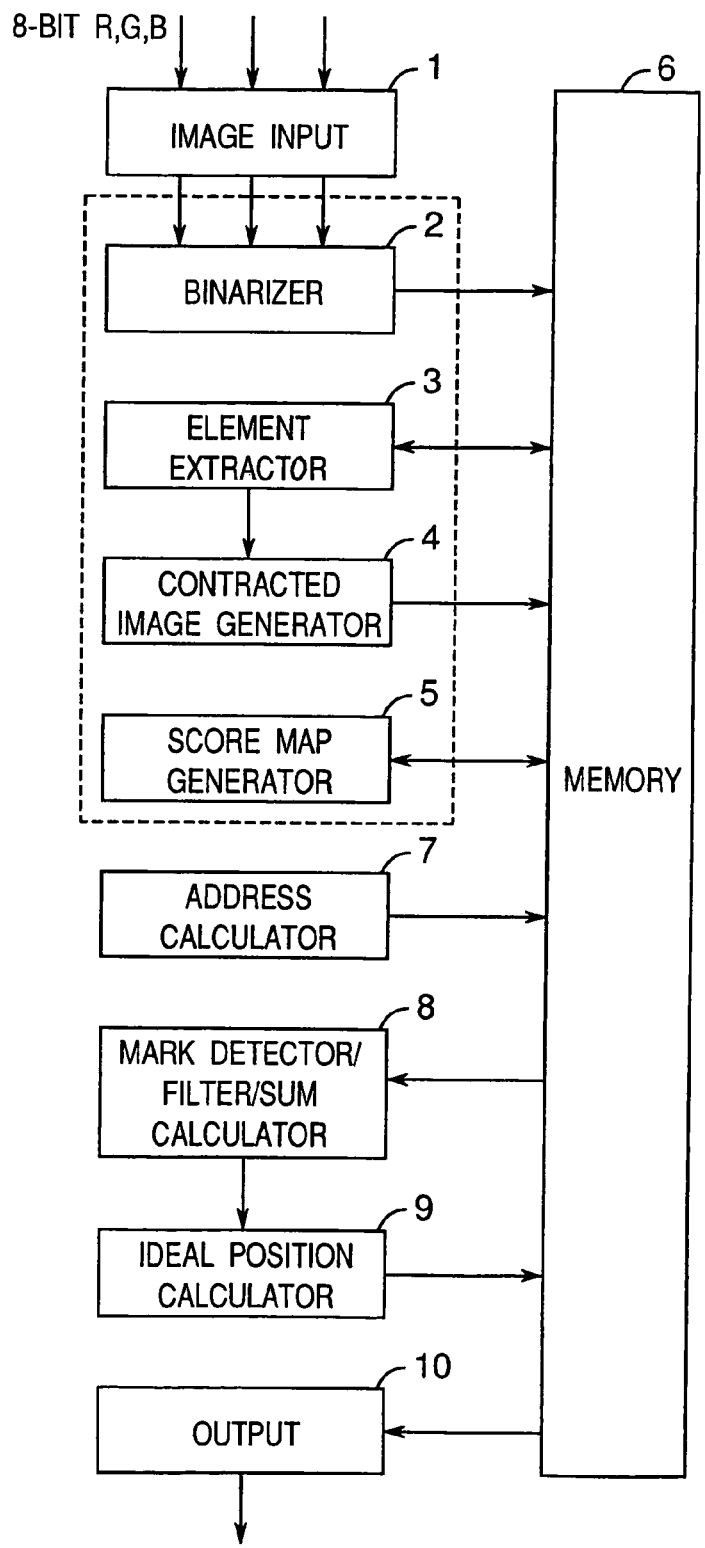
FIG. 1 is a block diagram of a specified pattern detection apparatus.

Referring now to the drawings, FIG. 1 shows a structure of a specified pattern detection apparatus of an embodiment of the invention generally. This apparatus detects a specified pattern (hereinafter referred to as mark) in an input image. An example of a mark to be detected in the embodiment has a configuration of five partial images (herein referred to as elements) having a predetermined color of a predetermined density and having the same shape and the same size. Two of the elements are arranged along a diameter of a circle of a predetermined radius, and the other three elements are arranged on coordinate positions prescribed relative to the two. However, it is to be noted that the shape, size, configuration and the like of a mark is not limited to the above-mentioned example, and various marks can be dealt with.

The processing of the specified pattern detection apparatus is explained generally. The apparatus reduces memory access times to detect a mark at high speed by decreasing resolution of image data. Hereinafter, "lower resolution" and "contraction" have the same meaning. First, input image are converted to a resolution for recognizing the elements, and they are binarized. The resultant bi-level image data is stored in a memory device. Next, elements are extracted from the bi-level image, and contracted images of the extracted elements are stored in a memory device at a resolution smaller than that of the original image. Next, mark detection processing is performed on the contracted element images by arranging a plurality of detection filters provided by taking rotation into account. According to a plurality of combinations of the detection filters, the five elements included in a mark are detected, and approximate position and rotation angle thereof are determined.

Next, the blocks shown in FIG. 1 are explained. First, an input image section 1 receives 8-bit density data of 256 gradation levels of three colors of R (red), green (G) and blue (B) obtained by reading an image. The input color data are subjected to resolution conversion, magnification change and the like. In the resolution conversion, the resolution is converted to a lower resolution at which the elements in a mark to be recognized can be detected.

Figure 2:
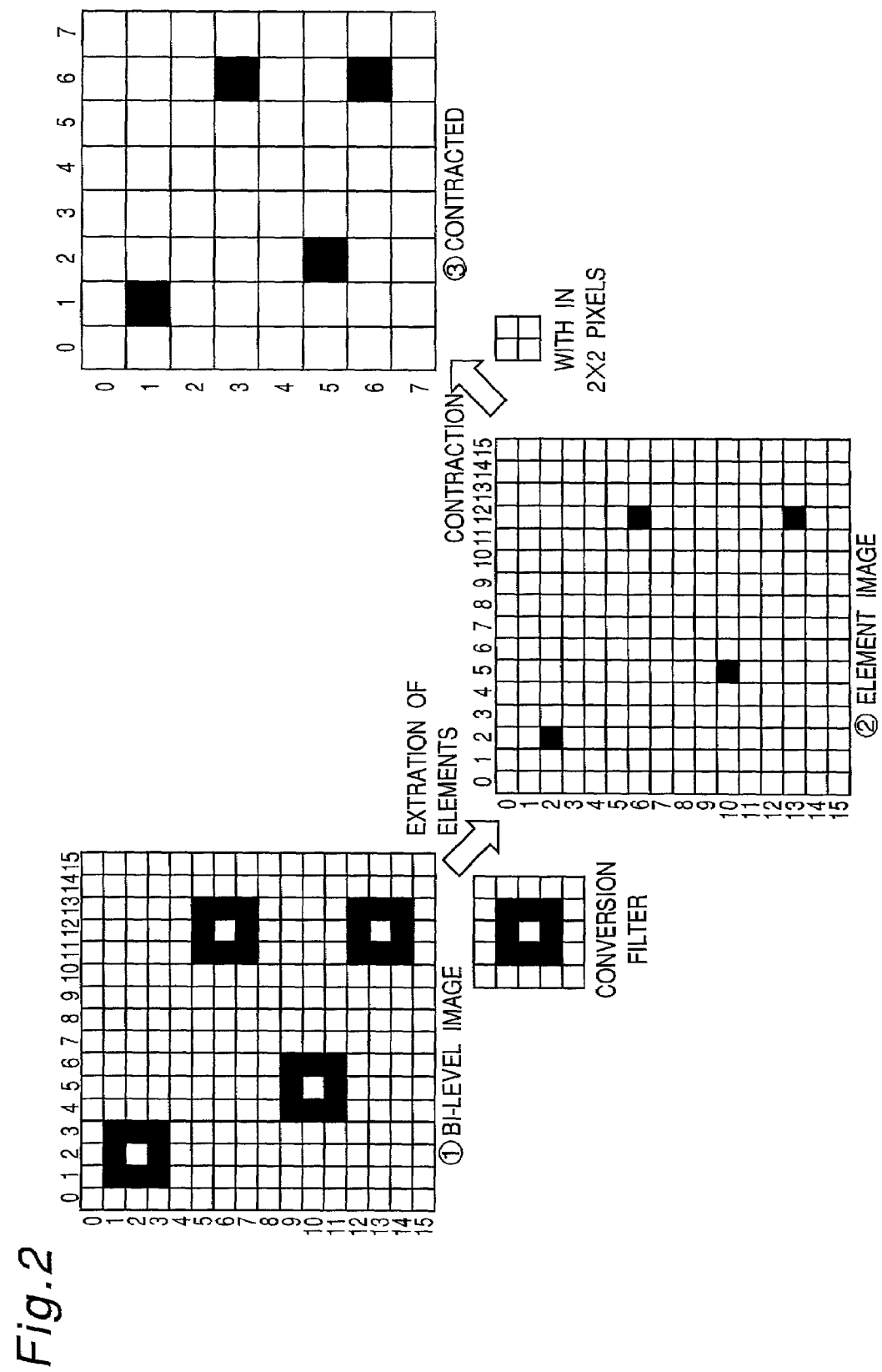
FIG. 2 is a diagram of an element extractor and a contracted image generator.

Next, preprocessing of the data is performed. A preprocessor is composed of components from a binarizer 2 to a score map generator 5 (enclosed with a dashed line in FIG. 1). In the binarizer 2, the input image data is binarized by deciding whether the input image data is within a predetermined density range, and the resultant bi-level data are stored in the memory device 6. (Hereinafter "black pixel" represents a pixel having a density within the predetermined density range, and "white pixel" represents a pixel having a density outside the range.) An element extracter 3 detects an element according to pixel information or the arrangement of the bi-level data binarized by the binarizer 2. Thus, as shown in FIG. 2, an element image as a result of the element extraction is obtained. A contracted image generator 4 generates an image of lower resolution of the element image information obtained by the element extracter 3 and stores the image in the memory device 6. The score map generator 5 generates 4-bit value according to the arrangement of the elements on all the pixels at the resolution to be recognized, based on the element image, and stores the obtained score map in the memory device 6. As mentioned above, the memory device 6 stores the bi-level image as the result of the binarization, the element image as the result of the element extraction, the contracted image and the score map. It has a capacity which can further store data of lines of a number equal to or larger than the mark size to be detected.

In the preprocessing, input image data are binarized by the binarizer 2 and are stored in the memory device 6. The element extracter 3 extracts elements of a mark and stores the result of the extraction in the memory device 6 as bi-level data (element image). Therefore, the number of memory access times is decreased, and the processing is accelerated.

In the preprocessing, the resolution of the extraction result (element image) is decreased further by the contracted image generator 4. Mark detection is performed on the image of the lower resolution by image recognition. Practically, in the image recognition, as will be explained in detail later, a plurality of detection filters provided by taking rotation into account are used on the element image of the lower resolution for detecting a roughly estimated position and rotation angle of a mark.

In a prior art preprocessing, in the resolution adopted for image recognition, every point in a filter having a size somewhat larger than a mark and distances between the points are checked. First, two points along a diameter in the five points in a mark are detected, and coordinates of the other three points are determined based on the coordinates of the two points. Then, by referring to the data around the theoretical positions obtained above, actual positions of the three points are extracted. In this method, ten or more memory accesses are necessary in order to detect one point, and this is a bottleneck for real time detection. On the contrary, in this embodiment, at the same time as elements are extracted, information around a reference pixel (element arrangement information) is stores as a 4-bit score map in the memory device. In recognition processing following the preprocessing, a score on element arrangement is calculated only by accessing the 4-bit data stored beforehand. Therefore, the times of memory access can be decreased further, and the processing can be performed at a higher speed.

The image recognition following the preprocessing is explained. A mark detector 8 reads the contracted image of the element image generated by the contracted image generator 4 from the memory device 6 and detects roughly estimated positions and rotation angles of a mark. The mark detector 8 includes filters and a sum calculator. An ideal position calculator 9 calculates ideal coordinates of the remaining three points of elements, based on coordinate positions of two points of the element arranged along a diameter of the mark detected by the mark detector 8. Then, by referring to the score map at the calculated positions, position scores of the three points are calculated. An output device 10 generates a score of the decision result (recognition result) and outputs it. An address calculator 7 calculates an address for the memory device 6 storing the data.

FIG. 2 shows processing of the element extracter 3 and the contracted image generator 4 generally. First, the element extracter 3 extracts elements from the bi-level image obtained by the binarizer 2, by using a conversion filter of 5*5 pixels. The filtering is performed on each of the pixels, and an element image is obtained. The element image has "black pixels" or pixels extracted as elements and "white pixels" or pixels not extracted as elements. The contracted image generator 4 generates a contracted image by OR operation of the element image or the element extraction result in a size of 2*2 pixels. In an example shown in FIG. 2, four elements are extracted with the conversion filter in the bi-level image of 16*16 pixels. Next, according to OR calculation in a range of 2*2 pixels, a contracted image of 8*8 pixels of the element image.

Figure 3:
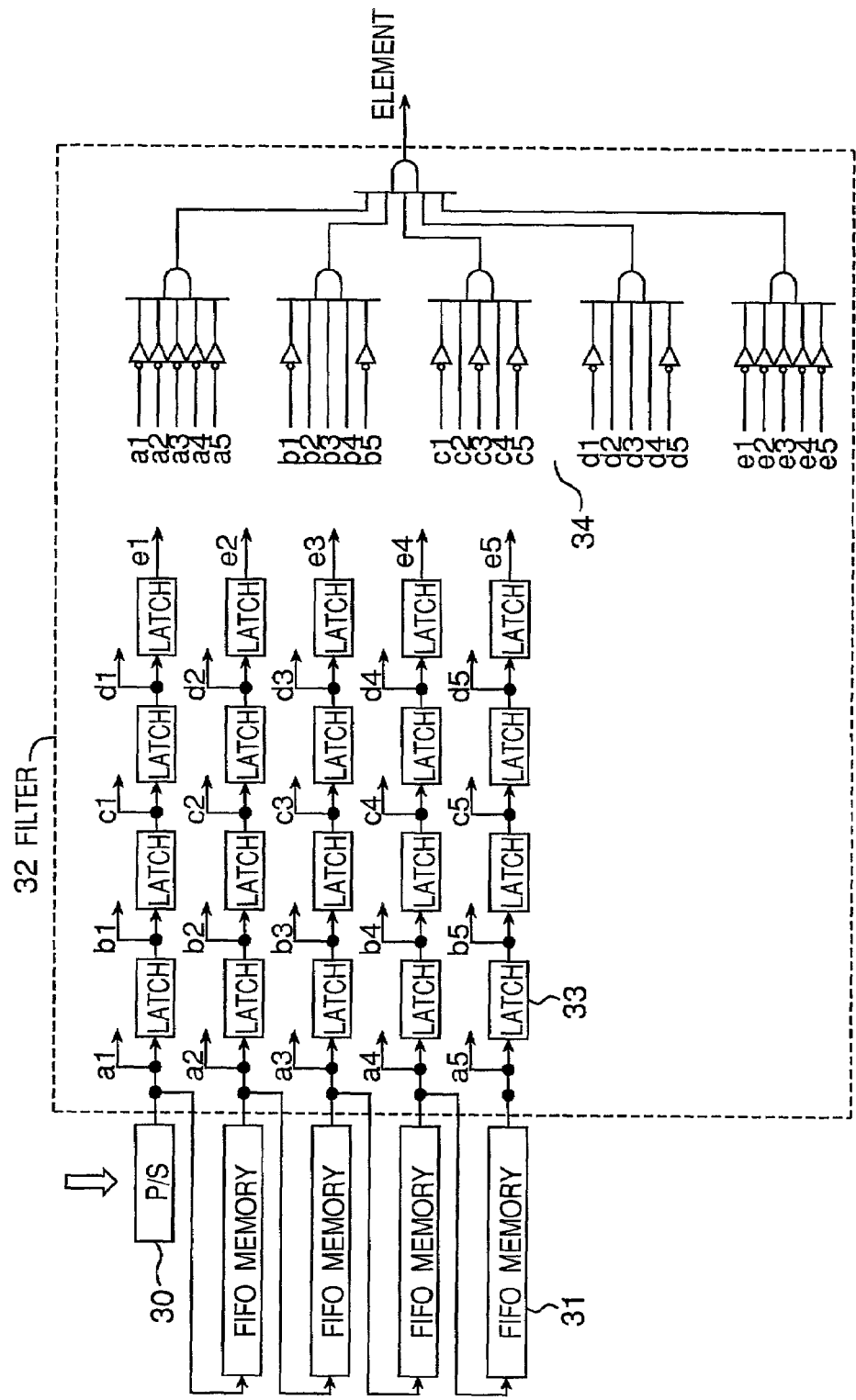
FIG. 3 is a circuit diagram of the element extractor.

FIG. 3 shows a hardware circuit of the element extracter 3. Bi-level image data of 16 bits read from the memory device are converted to a serial data by a parallel-to-serial converter 30 to be supplied to a filter circuit 32 one pixel by one pixel, while to be stored in four line memories (first-in first-out (FIFO) memories) 31 successively. Each FIFO memory is a line memory for storing one line of data. The FIFO memories are provided for four lines, so that data of five pixels are inputted in parallel in the subscan direction to the filter circuit 32.

The filter circuit 32 includes 1-bit latches 33 for five lines and four stages, and they provide data of 5*5 pixels to the conversion filter 34 of 5*5 pixels. The processed data (extraction result on the result of element extraction) is sent to the contracted image generator 4. Thus, an element image is obtained, and it has pixels extracted as elements as "black pixels" and pixels not extracted as elements as "white pixels".

Figure 4:
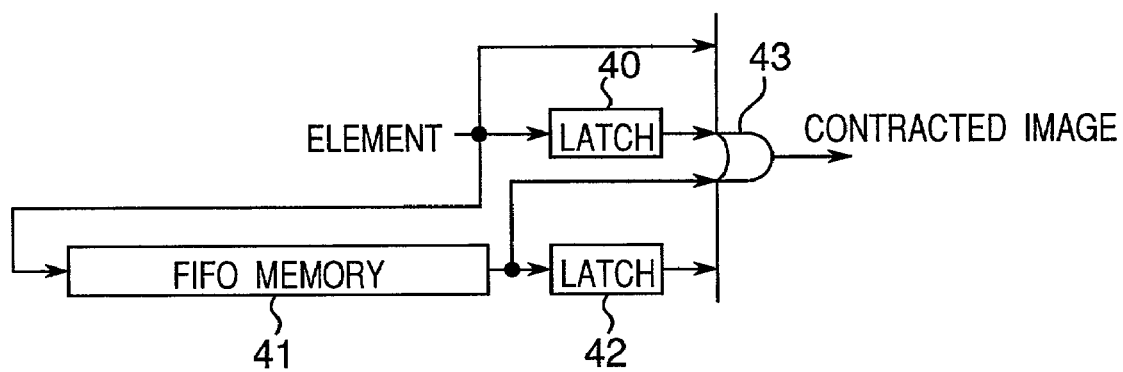
FIG. 4 is a circuit diagram of a contracted image generator.

FIG. 4 shows a hardware circuit of the contracted image generator 4. Similarly to the element extracter 3, it comprises a FIFO memory and latches. Input data from the element extracter 3 is outputted directly or via a latch 40 to an OR gate 43. Further, the input data is inputted to a FIFO memory 41 which stores one line of data. Data from the FIFO memory 41 is also outputted directly or via a latch 42 to the OR gate 43. The OR gate 43 decides whether a black pixel is included in the data of 2*2 pixels. The contracted image is outputted for every two pixels in the main scan direction and in the main scan direction. The output image is written to the memory device 6 every 16 pixels after serial-to-parallel conversion.

Figure 5:
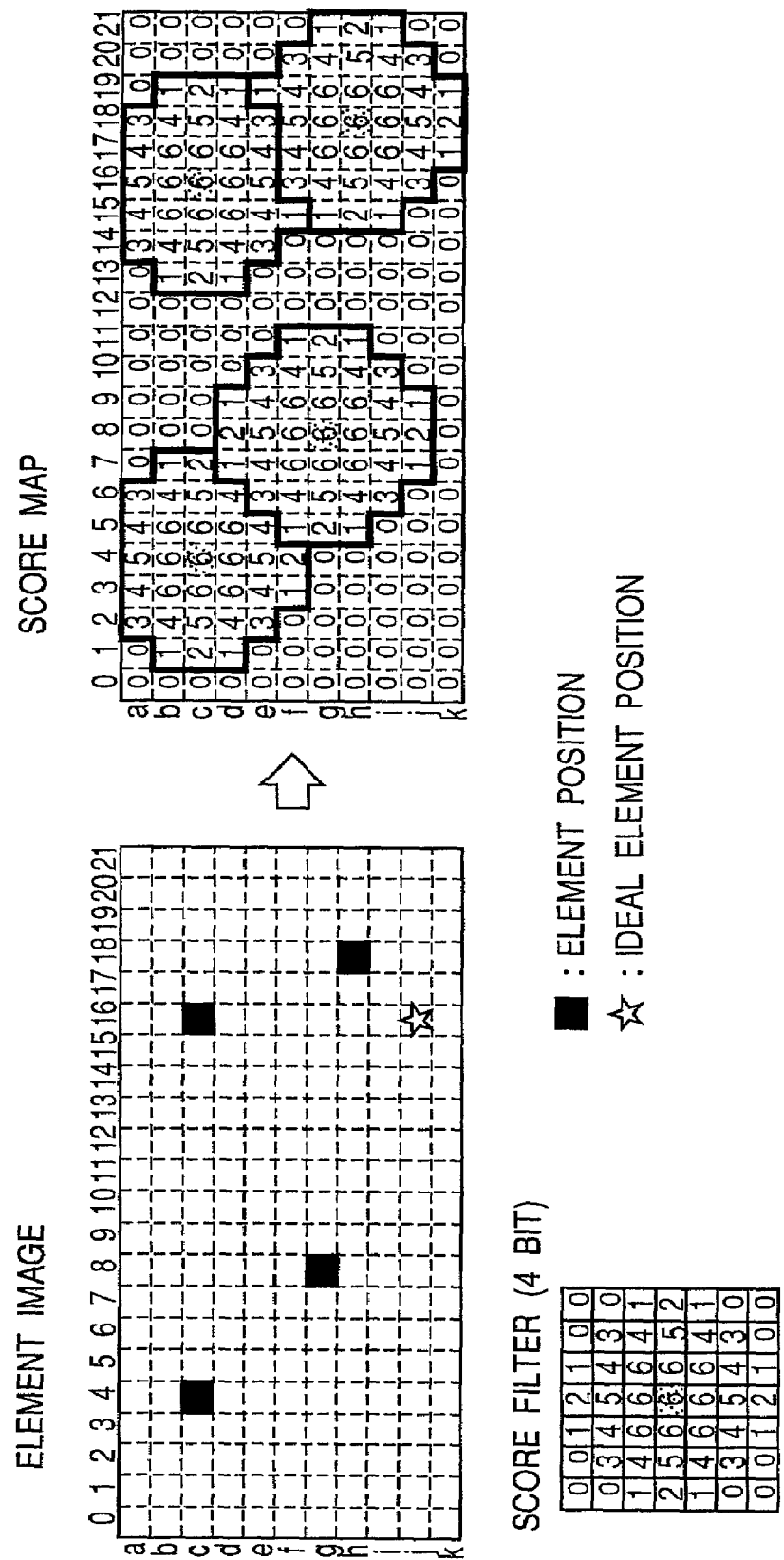
FIG. 5 is a diagram for illustrating a score map generator.

FIG. 5 shows the processing in the score map generator schematically. By using a score filter of 7*7 pixels shown at the lower left side in FIG. 5 on the element image extracted by the element extracter 3, a 4-bit element pixel information around an object pixel is obtained and written to the memory device 6. Scores in the score filter are determined by considering the distance from the position of the pixel (element position) at which an element exists. In an example of element image shown at the upper left side, black pixels represent element positions. Thus, a score map shown at the right side in FIG. 5 is obtained. Information of pixels in an image to be recognized is written to the memory device 6, as scores that take distance from the detected element into account. Thus, the number of memory access times is reduced when an image is recognized, and the processing is performed at a higher speed.

Figure 6:
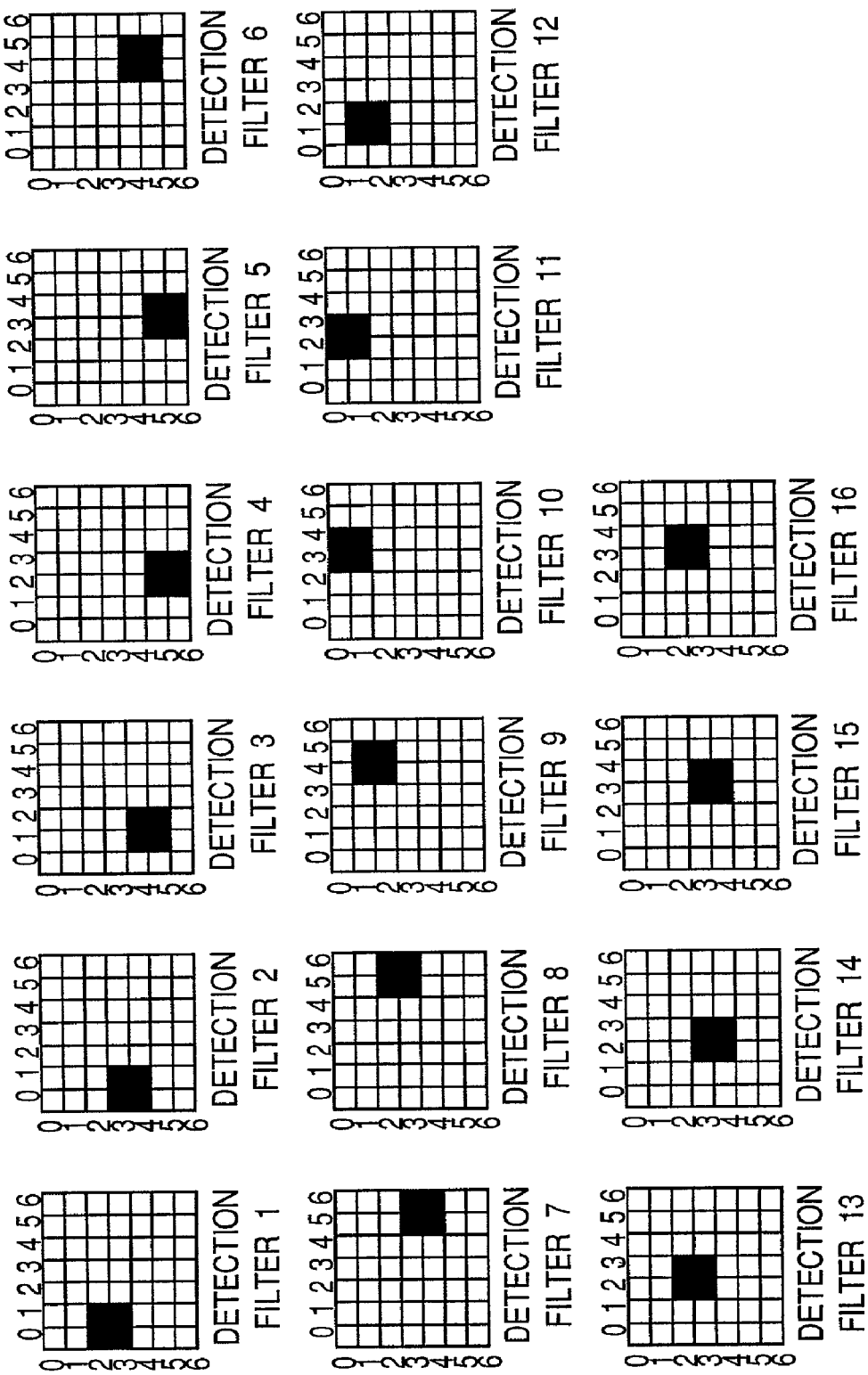
FIG. 6 is a diagram of detection filters.

Next, mark detection on the preprocessed data is explained. The mark detection is performed on the contracted image of a resolution lower than that of the element image. FIG. 6 shows an example of sixteen 7*7 detection filters. Each detection filter performs OR calculation in a partial area of a size of 2*2 pixels and outputs 1-bit data on the existence of black pixel. The detection filters include twelve types having the partial area at the outer portion and four types having the partial area at the inner portion concentrically, by taking rotation of mark into account.

Table 1 shows an example of combinations of detection filters provided for detecting a mark. In this example, detection of five points is performed by 12 combinations according to change in angle. If the number of combinations is increased, a plurality of marks can be detected easily. For example, in the first combination, first and seventh detection filters are combined to detect two points along a diameter line. Similarly, in the second combination, second and eighth detection filters are combined to detect two points along a diameter line. When black pixels are detected for all five filters in a combination, this means that the existence of a mark is detected.

TABLE 1

Combination of sixteen detection filters

| Combination | Detection filter numbers | | | | |
|---|---|---|---|---|---|
| 1st combination | 1 | 4 | 7 | 11 | 13 |
| 2nd combination | 2 | 5 | 8 | 12 | 13 |
| 3rd combination | 3 | 6 | 9 | 1 | 13 |
| 4th combination | 4 | 7 | 10 | 2 | 14 |
| 5th combination | 5 | 8 | 11 | 3 | 14 |
| 6th combination | 6 | 9 | 12 | 4 | 14 |
| 7th combination | 7 | 10 | 1 | 5 | 15 |
| 8th combination | 8 | 11 | 2 | 6 | 15 |
| 9th combination | 9 | 12 | 3 | 7 | 15 |
| 10th combination | 10 | 1 | 4 | 8 | 16 |
| 11th combination | 11 | 2 | 5 | 9 | 16 |
| 12th combination | 12 | 3 | 6 | 10 | 16 |

If the number of combinations of detection filters is increased, a plurality of types of marks can be dealt with easily. That is, detection filters as necessary can be used for detecting a plurality of types of marks.

Figure 7:
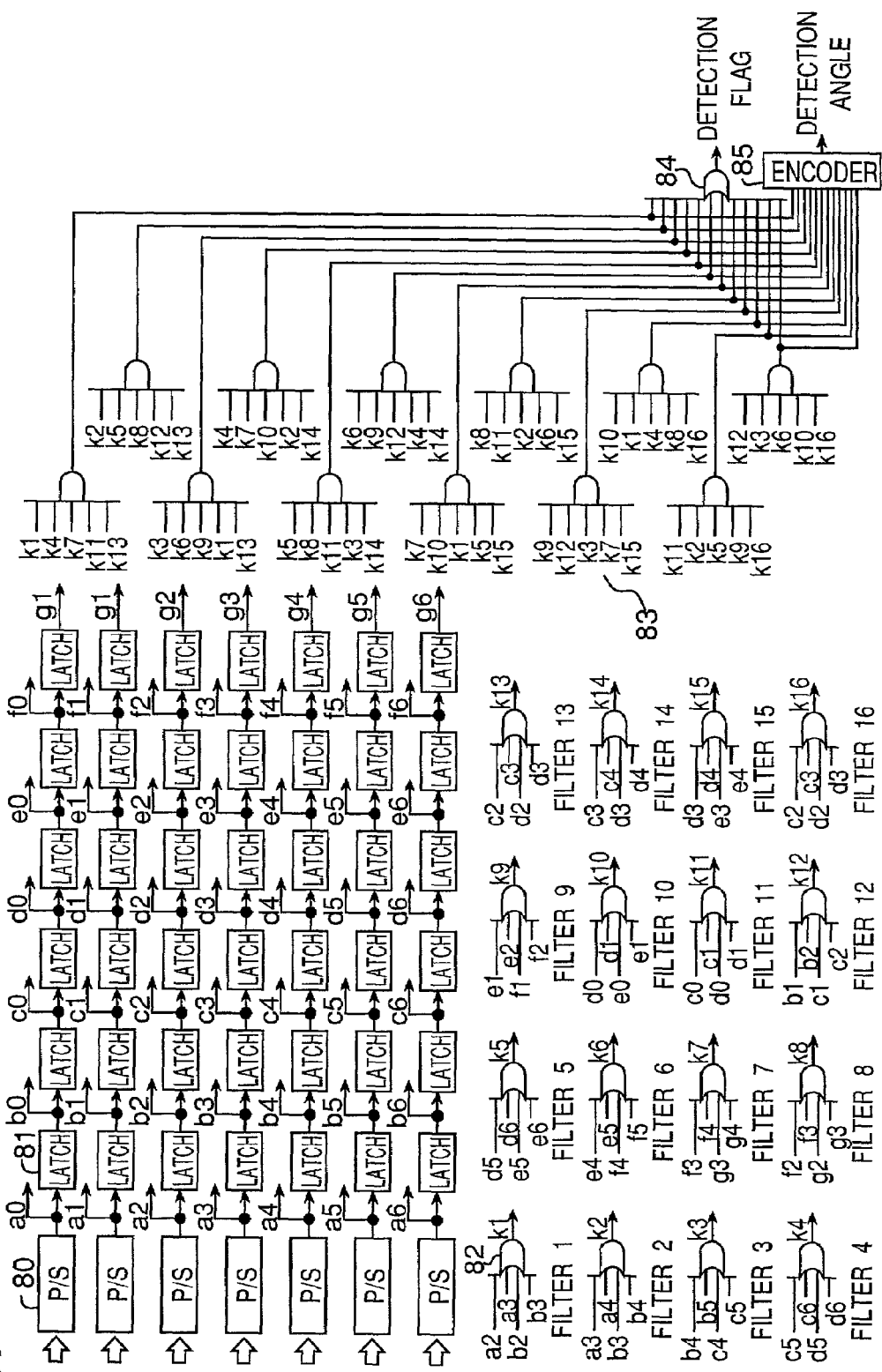
FIG. 7 is a diagram of a pattern detector including detection filters.

FIG. 7 shows a hardware circuit of detection filter in the mark detector 8. Data of seven lines of contracted image read from the memory device 6 are converted to serial data by parallel-to-serial converters 80, to be stored in 1-bit latches 81 successively. The latches 81 are provided for seven lines and six stages, as shown at the upper left side, and data of 7*7 pixels are processed at the same time. By combining outputs of the latches 81, sixteen detection filters 82, shown at the lower left side, are constructed, and they detect the existence of black pixel therein. Further, five of the detection results of the detection filters 82 are combined by a 5-input AND gate, in order to check whether the detection results of the five detection detectors are all at ON level. The result is outputted via an OR gate 84 as a detection flag that represents detection of a mark. That is, the flag is set when all outputs of the five detection filters are at ON level in any one of the combinations. Further, an encoder 85 outputs detection angle in correspondence to a combination on which the detection result of the five detection filters are all at ON level.

When a plurality of the combinations are detected at the same time, it is decided that the same mark is detected by adjacent combinations of detection filters, and one of the adjacent combinations may be used.

In the mark detector 8, the sum calculator calculates a number of black pixels in a range of 7*7 pixels of the contracted image. If a combination exists wherein all the five detection filters for five points are at ON level and the sum value obtained by the sum calculator is five, it is decided that a mark is detected. Next, the ideal position calculator 9 detects correct coordinate positions before the reduction on the two points or elements along the diameter. Then, ideal coordinate positions of the remaining three points or elements are calculated based on the coordinates of the two points.

The output section 10 outputs a score of the decision result (recognition result). A score map of ideal coordinate position is referred. Scores are allocated to a 4-bit value in the score map. For example, score of six corresponds to 100, score of five corresponds to 80, score of four corresponds to 65, and so on. The 4-bit value represents classification of distance to an element, and it has high score as the ideal position is nearer to the actual element position. Finally, a total score is calculated according to the scores of the three elements, and recognition result is outputted.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A specified pattern detection apparatus comprising:
    a plurality of filters provided for detecting an image of a specified pattern at a first pixel resolution;
    an extractor which extracts a specified pattern included in the image of the specified pattern with use of a combination of filters in said plurality of filters to determine a position and rotation of the specified pattern;
    a circuit for generating an image of the specified pattern at a resolution lower than the first resolution;
    a calculator which determines the position of the image of the specified pattern more precisely than said extractor, based on the position and rotation determined by said extractor and the lower resolution image; and
    wherein each filter performs detection in a partial area of the image, the specified pattern being detected when a preset combination of filters detects a portion of the pattern.

2. A specified pattern detection apparatus corrmprising:
    a plurality of filters provided for detection of an image of a specified pattern;
    an extractor which extracts a specified pattern included in the image of the specified pattern with use of a combination of filters in said plurality of filters to determine a position of the specified pattern;
    a calculator which determines the position of the specified pattern more precisely than said extractor, based on the position determined by said extractor;
    a binarizer which binarizes input image data to provide bi-level image data;
    an image extractor which extracts specified partial images included in the image of the specified pattern, in the bi-level image data obtained by said binarizer; and
    a reduced image generator which generates a reduced image of an image including the specified partial images, the reduced image having a lower resolution than the image including the specified partial images;
    wherein said extractor extracts the specified pattern included in the reduced image generated by said reduced image generator; and
    wherein each filter performs detection in a partial area of the image, the specified pattern being detected when a preset combination of filters detects a portion of the pattern.

3. The specified pattern detection apparatus according to claim 1, wherein the filters in the combination of filters are positioned along a circumferential line.

4. The specified pattern detection apparatus according to claim 2, wherein the filters in the combination of filters are positioned along a circumferential line.

5. The specified pattern detection apparatus according to claim 1, wherein the plurality of filters are provided for extracting images of a plurality of types of specified patterns.

6. The specified pattern detection apparatus according to claim 2, wherein the plurality of filters are provided for extracting images of a plurality of types of specified patterns.

7. A method for detecting a specified pattern comprising the steps of:
   extracting a specified pattern included in an image of a specified pattern of a first resolution with use of a combination of filters in a plurality of filters provided for image detection and determining a position and rotation of the specified pattern;
   generating an image at a resolution lower than the first resolution of the image of the specified pattern;
   further determining the position of the specified pattern more precisely based on the determined position and rotation of the lower resolution image; and
   performing detection in a partial area of the image with each filter, and detecting the specified pattern when a preset combination of filters detect a portion of the pattern.

8. A method for detecting a specified pattern comprising the steps of:
   extracting a specified pattern included in an image of the specified pattern with use of a combination of filters in a plurality of filters provided for image detection and determining a position of the specified pattern;
   further determining the position of the specified pattern more precisely based on the determined position;
   binarizing input image data to provide bi-level image data;
   extracting specified partial images in the bi-level image data; and
   generating a reduced image of an image including the specified partial images, the reduced image having a lower resolution than the image including the specified partial images;
   wherein the specified pattern is extracted in the reduced image; and
   wherein each filter performs detection in a partial area of the image, the specified pattern being detected when a preset combination of filters detects a portion of the pattern.

9. A specified pattern detection apparatus comprising:
   a binarizer which binarizes input image data to provide bi-level image data;
   a storage device which stores the bi-level image data obtained by said binarizer;
   a partial image extractor which extracts specified partial images in the bi-level image stored in said storage device with a filter for conversion;
   a gain calculator which calculates and stores information for each pixel in the bi-level image, in which the specified partial images are extracted, with a gain filter, the information representing a distance from the each pixel to the specified partial image;
   a position calculator which calculates ideal positions of the partial images to be included in a specified pattern;
   a gain output device which outputs a gain on the ideal positions based on the information obtained and stored by said gain calculator; and
   filters that each perform detection in a partial area of the image, the specified pattern being detected when a preset combination of the filters detects a portion of the pattern.

10. The specified pattern detection apparatus according to claim 9, wherein said conversion filter converts the partial image stored in said storage device to 1-bit data.

11. A method for detecting a specified pattern comprising the steps of:
   binarizing input image data to provide bi-level image data;
   storing the bi-level image data;
   extracting specified partial images in the bi-level image stored with a filter for conversion;
   calculating and storing information for each pixel in the bi-level image, in which the specified partial images are extracted, with a gain filter, the information representing a distance from the each pixel to the specified partial image;
   calculating ideal positions of the partial images;
   outputting a gain on the calculated ideal positions based on the information obtained by said gain calculator; and
   performing detection in a partial area of the image with filters, and detecting the specified pattern when a preset combination of the filters detects a portion of the pattern.

* * * * *